US011215910B2

(12) United States Patent
Tanaka

(10) Patent No.: US 11,215,910 B2
(45) Date of Patent: Jan. 4, 2022

(54) LIGHT SOURCE DEVICE AND PROJECTION DISPLAY APPARATUS HAVING A LASER OPTICAL SYSTEM, A FLUORESCENCE OPTICAL SYSTEM, AND A LIGHT COMBINER

(71) Applicant: Panasonic Intellectual Property Management Co., Ltd., Osaka (JP)

(72) Inventor: Takaaki Tanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/843,404

(22) Filed: Apr. 8, 2020

(65) Prior Publication Data

US 2020/0333697 A1 Oct. 22, 2020

(30) Foreign Application Priority Data

Apr. 16, 2019 (JP) .............................. JP2019-077769

(51) Int. Cl.
*G03B 21/20* (2006.01)
*H04N 9/31* (2006.01)
(Continued)

(52) U.S. Cl.
CPC ......... *G03B 21/204* (2013.01); *G02B 27/141* (2013.01); *G02B 27/48* (2013.01);
(Continued)

(58) Field of Classification Search
CPC .............. G03B 21/204; G03B 21/2013; G03B 21/2066; G03B 21/2073; H04N 9/3164; H04N 9/3161; H04N 9/3158
See application file for complete search history.

(56) References Cited

U.S. PATENT DOCUMENTS

| 5,313,479 A | 5/1994 | Florence |
| 8,016,425 B2 * | 9/2011 | Ito ........................... G03B 21/14 |
| | | 353/31 |

(Continued)

FOREIGN PATENT DOCUMENTS

| JP | 6-208089 | 7/1994 |
| JP | 2006-251556 | 9/2006 |

(Continued)

*Primary Examiner* — Bao-Luan Q Le
(74) *Attorney, Agent, or Firm* — Wenderoth, Lind & Ponack, L.L.P.

(57) ABSTRACT

A light source device includes a laser optical system, a fluorescence optical system, and a light combiner combining first and second outgoing lights from the laser optical system and the fluorescent optical system. The laser optical system includes first laser optical sources emitting a plurality of outgoing lights respectively, the plurality of outgoing lights being blue, green, and red lights, or blue and red lights; a first dichroic mirror combining the plurality of outgoing lights from the first laser optical sources, and a diffusion plate reducing speckle noise and an uneven luminance of each of the plurality of outgoing lights. The fluorescence optical system includes a second laser light source, and a phosphor plate emitting, as the second outgoing light, a fluorescent light containing green and red lights by being excited by an outgoing light from the second laser light source. The light combiner includes a second dichroic mirror.

9 Claims, 8 Drawing Sheets

(51) Int. Cl.
*G02B 27/14* (2006.01)
*G02B 27/48* (2006.01)

(52) U.S. Cl.
CPC ..... *G03B 21/2013* (2013.01); *G03B 21/2066* (2013.01); *G03B 21/2073* (2013.01); *H04N 9/3158* (2013.01); *H04N 9/3161* (2013.01); *H04N 9/3164* (2013.01)

(56) References Cited

U.S. PATENT DOCUMENTS

| | | | | |
|---|---|---|---|---|
| 8,573,779 | B2* | 11/2013 | Yamagishi | G03B 21/2013 353/33 |
| 8,955,985 | B2* | 2/2015 | Matsubara | G03B 21/204 353/84 |
| 9,325,955 | B2* | 4/2016 | Ogino | H04N 9/3111 |
| 9,467,670 | B2* | 10/2016 | Yamada | H04N 9/3161 |
| 9,563,109 | B2* | 2/2017 | Matsubara | G03B 21/204 |
| 9,684,178 | B2* | 6/2017 | Huang | G02B 30/36 |
| 9,759,991 | B2* | 9/2017 | Sheng | G03B 21/204 |
| 10,257,480 | B2* | 4/2019 | Chikahisa | G03B 21/008 |
| 10,261,401 | B2* | 4/2019 | Tanaka | H04N 9/3158 |
| 10,578,958 | B2* | 3/2020 | Wu | G02B 26/008 |
| 2008/0180640 | A1* | 7/2008 | Ito | G03B 33/08 353/31 |
| 2011/0234923 | A1* | 9/2011 | Yamagishi | G03B 21/204 348/757 |
| 2011/0292349 | A1* | 12/2011 | Kitano | G03B 21/2013 353/31 |
| 2013/0194552 | A1* | 8/2013 | Matsubara | G03B 21/2033 353/31 |
| 2014/0168614 | A1* | 6/2014 | Matsubara | G02B 27/141 353/31 |
| 2014/0247429 | A1* | 9/2014 | Ogino | G03B 21/2066 353/31 |
| 2015/0341605 | A1* | 11/2015 | Yamada | G02B 19/00 353/30 |
| 2016/0054574 | A1* | 2/2016 | Huang | G03B 21/204 349/33 |
| 2016/0077419 | A1* | 3/2016 | Sheng | G03B 21/204 353/20 |
| 2016/0334695 | A1* | 11/2016 | Yamada | G03B 21/2066 |
| 2017/0013240 | A1* | 1/2017 | Chikahisa | G02B 5/3083 |
| 2017/0343891 | A1* | 11/2017 | Sakata | G03B 21/206 |
| 2018/0157157 | A1* | 6/2018 | Wu | G03B 21/2033 |
| 2018/0217486 | A1 | 8/2018 | Tanaka | |
| 2019/0041735 | A1* | 2/2019 | Tanaka | G03B 21/204 |
| 2019/0072245 | A1* | 3/2019 | Kobayashi | H04N 9/3164 |
| 2019/0179220 | A1* | 6/2019 | Hu | G03B 21/2066 |
| 2020/0124955 | A1* | 4/2020 | Hu | G03B 21/204 |

FOREIGN PATENT DOCUMENTS

| | | |
|---|---|---|
| JP | 2012-194268 | 10/2012 |
| JP | 2016-184064 | 10/2016 |
| JP | 6141512 | 6/2017 |
| JP | 2018-124538 | 8/2018 |

\* cited by examiner

LIGHT SOURCE DEVICE AND PROJECTION DISPLAY APPARATUS HAVING A LASER OPTICAL SYSTEM, A FLUORESCENCE OPTICAL SYSTEM, AND A LIGHT COMBINER

BACKGROUND

1. Technical Field

The present disclosure relates to a projection display apparatus that irradiates an image formed on an image forming element with an illumination light to magnify and project the image on a screen using a projection lens, and a light source device employed in the projection display apparatus.

2. Description of the Related Art

Many disclosed light source devices employ solid-state light sources that have long service life, such as semiconductor laser and light-emitting diode, as a light source of a projection display apparatus employing a mirror-deflection digital micromirror device or image forming elements of liquid crystal panel. In these devices, a highly efficient light source device with a wide color gamut using blue, green, and red solid-state light sources is disclosed.

Patent Literature (PTL) 1 discloses a speckle-free display apparatus using coherent light. In PTL 1, outgoing lights from red laser, blue laser, and green laser are combined by three corresponding dichroic mirrors, and enter a diffusing element. The diffusing element is configured with a frosted glass, and rotated by a motor. A light diffused by the diffusing element illuminates a spatial light modulator via a lens. A projection lens magnifies and projects an image formed by the spatial light modulator on a screen. A speckle noise is generated when a laser light with high coherence is used for forming an image on a screen. The speckle noise is a random interference pattern generated by mutual interference of laser lights reflected on a screen having finely roughened surface, and is observed as light and dark spots in the image. This speckle noise is eliminated by employing a rotatable diffusing element.

As another means of eliminating the speckle noise, Patent Literature (PTL) 2 discloses a structure of combining multiple despeckle wheels having a despeckle region where a despeckle element effective for despeckle effect is formed and a transmission region that transmit light. The despeckle region has functions of diffraction, diffusion, and/or phase difference.

PTL 1 is Unexamined Japanese Patent Publication No. H6-208089.

PTL 2 is Unexamined Japanese Patent Publication No. 2016-184064.

SUMMARY

In a structure of a conventional light source device, the use of multiple rotatable diffusion plate is not sufficient for eliminating speckle noise. In addition, fine uneven luminance occurs on a screen of a light source device equipped with an array of semiconductor laser elements, due to division of an emission region of the light source device to correspond to the multiple semiconductor laser elements and a minute emission region of each semiconductor laser element. Accordingly, there is a demand for further suppressing speckle noise and fine uneven luminance by using red, green and blue solid light sources.

The present disclosure offers a light source device using blue, green, and red solid light sources, and a projection display apparatus employing the light source device. The light source device of the present disclosure is smaller in size, compared to the prior art, and can successfully suppress speckle noise and fine uneven luminance.

The light source device in accordance with the first exemplary embodiment of the present disclosure includes a laser optical system, a fluorescence optical system, and a light combiner combining a first outgoing light from the laser optical system and a second outgoing light from the fluorescence optical system. The laser optical system includes a plurality of first laser light sources that emit a plurality of outgoing lights respectively, the plurality of outgoing lights being a blue light, a green light, and a red light, or a blue light and a red light; a first dichroic mirror combining the plurality of outgoing lights from the plurality of first laser light sources into the first outgoing light, and a diffusion plate reducing speckle noise and an uneven luminance of each of the plurality of outgoing lights from the first laser light sources. The fluorescence optical system includes a second laser light source and a phosphor plate emitting, as the second outgoing light, a fluorescent light containing a green light and a red light by being exited by an outgoing light from the second laser light source. The light combiner includes a second dichroic mirror. The light source device in accordance with the second exemplary embodiment of the present disclosure includes a laser optical system, a fluorescence optical system, and a light combiner combining a first outgoing light from the laser optical system and a second outgoing light from the fluorescence optical system. The laser optical system includes a plurality of first laser light sources emitting a plurality of outgoing lights respectively, the plurality of outgoing lights being a blue light, a green light, and a red light; a dichroic mirror combining the plurality of outgoing lights from the plurality of first laser light sources into the first outgoing light, and a diffusion plate reducing speckle noise and an uneven luminance of each of the plurality of outgoing lights from the plurality of first laser light sources. The fluorescence optical system includes a second laser light source and a phosphor plate emitting, as the second outgoing light, a fluorescent light containing a green light and a red light by being excited by an outgoing light from the second laser light source. The light combiner includes a prism configured to deflect and combine the first outgoing light from the laser optical system and the second outgoing light from the fluorescence optical system.

In the exemplary embodiments of the present disclosure, the dichroic mirror combines the blue, green, and red lights with reduced speckle noise from the laser light sources and the fluorescent light without speckle noise. Accordingly, the present disclosure offers a high-luminance light source device smaller in size, compared to the prior art, that can generate outgoing lights with a wide color gamut, while suppressing speckle noise and fine uneven luminance.

DETAILED DESCRIPTION

Exemplary embodiments of the present disclosure are described below with reference to drawings.

1. First Exemplary Embodiment

[1-1. Structure]

Figure 1:
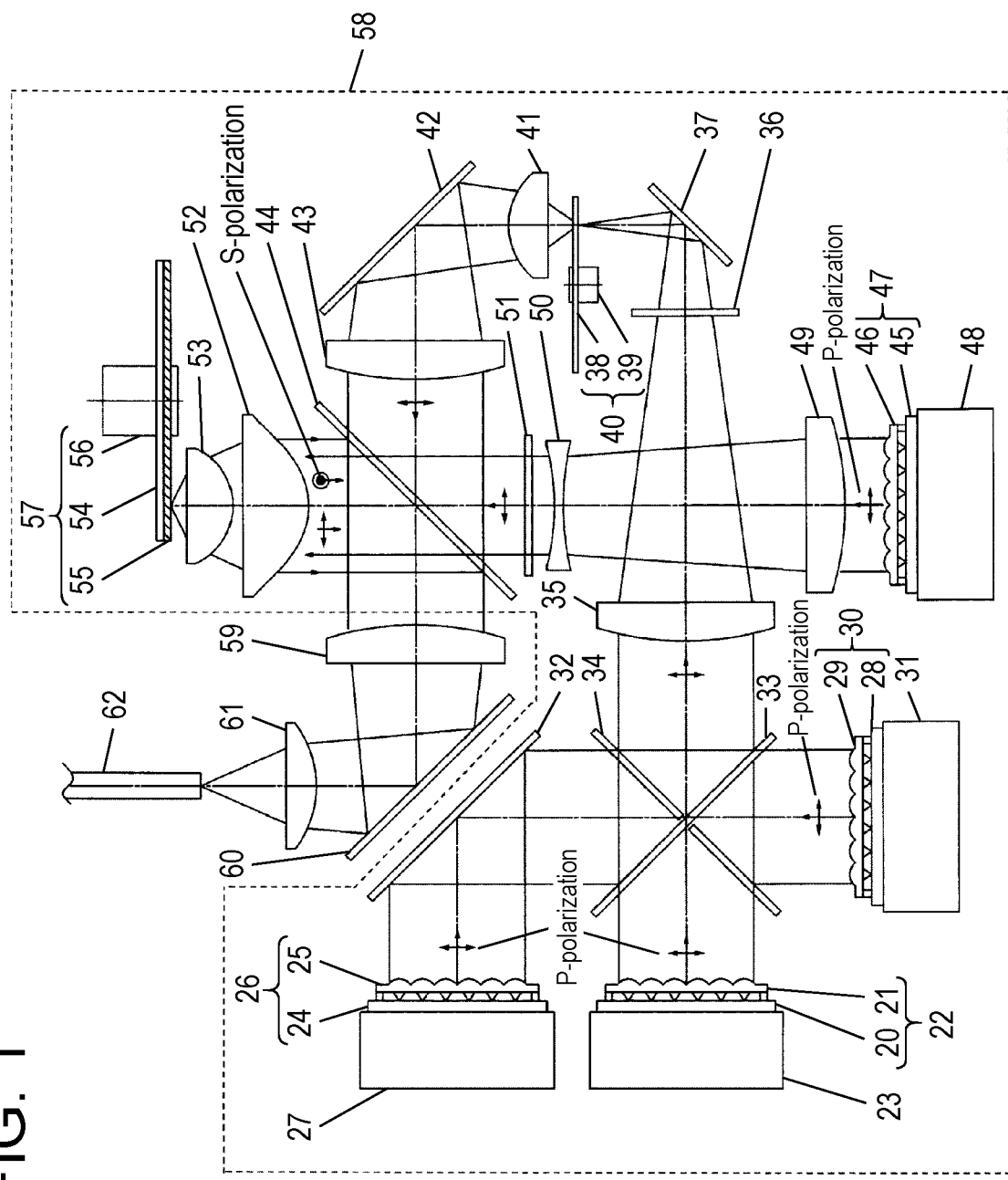
FIG. 1 is a schematic plan view of a structure of a light source device in accordance with a first exemplary embodiment.

FIG. 1 is a schematic plan view illustrating a structure of light source device 58 in the first exemplary embodiment.

In FIG. 1, light source device 58 includes green laser light source 22, red laser light source 26, and blue laser light source 30 that are first laser light sources, and excitation laser light source 47 that is a second laser light source. Green laser light source 22 includes green semiconductor laser substrate 20 on which multiple green semiconductor laser elements are disposed, and collimator lens array 21. Red laser light source 26 includes red semiconductor laser substrate 24 on which multiple red semiconductor laser elements are disposed, and collimator lens array 25. Blue laser light source 30 includes blue semiconductor laser substrate 28 on which multiple blue semiconductor laser elements are disposed, and collimator lens array 29. Excitation laser light source 47 includes blue semiconductor laser substrate 45 on which multiple blue semiconductor laser elements are disposed, and collimator lens array 46.

Light source device 58 also includes heat dissipation plates 23, 27, 31, and 48, and mirrors 32, 37, and 42. Furthermore, light source device 58 includes red reflective dichroic mirror 33 and blue reflective dichroic mirror 34 that are first dichroic mirrors, condenser lenses 35, 41, 43, 49, 50, 52, and 53; diffusion plates 36 and 51, and rotary diffusion plate 40 having circular diffusion plate 38 and motor 39. Light source device 58 further includes dichroic mirror 44 that is a second dichroic mirror, and phosphor plate 57 having aluminum substrate 54 and motor 56. A reflection film and phosphor layer 55 are formed on aluminum substrate 54. Condenser lenses 59 and 61, mirror 60, and rod integrator 62 are provided outside light source device 58.

Polarization directions of outgoing lights from the laser light sources and incident lights and outgoing lights of the dichroic mirrors are indicated in FIG. 1.

In the exemplary embodiment, an optical system from green laser light source 22, red laser light source 26, and blue laser light source 30 to dichroic mirror 44 is referred to as a "laser optical system." An optical system from excitation laser light source 47 to phosphor plate 57 is referred to as a "fluorescence optical system."

[1-1-1. Laser Optical System]

Green laser light source 22 includes green semiconductor laser substrate 20 on which multiple green semiconductor laser elements are two-dimensionally arranged at predetermined intervals, and collimator lens array 21 on which multiple collimator lenses corresponding to the green semiconductor laser elements are two-dimensionally arranged at predetermined intervals. For example, green laser light source 22 has 24 (=6×4) green semiconductor laser elements and 24 collimator lenses. Each of the green semiconductor laser elements on green semiconductor laser substrate 20 generates and emits a linearly polarized green laser light at a wavelength of 525±8 nm. The outgoing lights from the green semiconductor laser elements on green semiconductor laser substrate 20 are condensed by corresponding collimator lenses of collimator lens array 21, and converted to a parallel luminous flux. Heat dissipation plate 23 cools green semiconductor laser substrate 20.

Red laser light source 26 includes red semiconductor laser substrate 24 on which multiple red semiconductor laser elements are two-dimensionally arranged at predetermined intervals, and collimator lens array 25 on which multiple collimator lenses corresponding to the red semiconductor laser elements are two-dimensionally arranged at predetermined intervals. For example, red laser light source 26 has 24 (=6×4) red semiconductor laser elements and 24 collimator lenses. Each of the red semiconductor laser elements on red semiconductor laser substrate 20 generates and emits a linearly polarized red laser light at a wavelength of 640±8 nm. The outgoing lights from the red semiconductor laser elements on red semiconductor laser substrate 24 are condensed by corresponding collimator lenses of collimator lens array 25, and converted to a parallel luminous flux. Heat dissipation plate 27 cools red semiconductor laser substrate 24.

Blue laser light source 30 includes blue semiconductor laser substrate 28 on which multiple blue semiconductor laser elements are two-dimensionally arranged at predetermined intervals, and collimator lens array 29 on which multiple collimator lenses corresponding to the blue semiconductor laser elements are two-dimensionally arranged at predetermined intervals. For example, blue laser light source 30 has 12 (=6×2) blue semiconductor laser elements and 12 collimator lenses. Each of the blue semiconductor laser elements on blue semiconductor laser substrate 28 generates and emits a linearly polarized blue laser light at a wavelength of 465±8 nm. The outgoing lights from the blue semiconductor laser elements on blue semiconductor laser substrate 28 are condensed by corresponding collimator lenses of collimator lens array 29, and converted to a parallel luminous flux. Heat dissipation plate 31 cools blue semiconductor laser substrate 28.

The blue semiconductor laser elements have higher luminous efficiency and require smaller light output for generating a white light having predetermined chromaticity, compared to that of the red semiconductor laser elements and the green semiconductor laser elements. Accordingly, in the above structure, the number of blue semiconductor laser elements is half of the number of red semiconductor laser elements and the number of green semiconductor laser elements.

Laser lights emitted from green laser light source 22 and blue laser light source 30 and a laser light emitted from red laser light source 26 and reflected on mirror 32 enter red reflective dichroic mirror 33 and blue reflective dichroic mirror 34. Green laser light source 22, red laser light source 26, and blue laser light source 30 are arranged in a way such that each emitted laser light having p-polarized component enters red reflective dichroic mirror 33 and blue reflective dichroic mirror 34 at an incident angle of 45 degrees. Red reflective dichroic mirror 33 has a characteristic of passing 95% or more of the green laser light and blue laser light entered, and reflecting 97% or more of the red laser light entered. A half maximum wavelength at which the transmittance of red reflective dichroic mirror 33 becomes 50% is set to 583 nm. Blue reflective dichroic mirror 34 has a characteristic of passing 95% or more of the red laser light and green laser light entered, and reflecting 97% or more of the blue laser light entered. A half maximum wavelength at which the transmittance of blue reflective dichroic mirror 34 becomes 50% is set to 495 nm.

In the example shown in FIG. 1, blue reflective dichroic mirror 34 is divided into two parts and they are disposed on both sides of red reflective dichroic mirror 33, respectively. In other words, blue reflective dichroic mirror 34 is disposed crossing red reflective dichroic mirror 33 at the same position.

Laser lights combined at red reflective dichroic mirror 33 and blue reflective dichroic mirror 34 enter condenser lens 35. The shape of condenser lens 35 is determined such that each laser light is condensed near rotary diffusion plate 40. The laser lights passing condenser lens 35 are diffused by diffusion plate 36, are then reflected on mirror 37, and enter rotary diffusion plate 40.

Diffusion plate 36 has a diffusion surface formed by arranging an array of fine micro-lenses on a glass substrate to diffuse incident light. Micro-lenses can reduce the maximum spreading angle, compared to a diffusion plate that has a glass substrate surface finely roughened by chemical treatment, typically using hydrofluoric acid solution. A diffusion loss can thus be reduced. The diffusion angle of diffusion plate 36, i.e., a half maximum angle width at which the intensity is 50% of the maximum intensity of diffused light, is as small as approximately 3 degrees. Accordingly, diffusion plate 36 retains the polarization characteristics of the incident light. Diffusion plate 36 diffuses the incident light such that a spot light diameter of the outgoing light from diffusion plate 36 entering one of optical elements in a subsequent step has a predetermined spot diameter. Here, the spot diameter is defined as a diameter that achieves 13.5% of the peak light intensity. For example, diffusion plate 36 is configured such that the spot light has a spot diameter of 2.5 to 3.5 mm when the outgoing light from diffusion plate 36 is made incident on near rotary diffusion plate 40.

Rotary diffusion plate 40 includes circular diffusion plate 38 having a diffusion layer circumferentially formed on a glass substrate, and motor 39 provided at the center of circular diffusion plate 38; and is rotationally driven. The circular diffusion plate is rotated at a high speed, for example, around 10800 rpm at maximum. The diffusion layer is formed by finely roughening the glass substrate surface by chemical treatment. Rotary diffusion plate 40 has a diffusion angle of approximately 15 degrees. Accordingly, rotary diffusion plate 40 retains the polarization characteristics of the incident light. The diffusion layer may be formed on both surfaces of the glass substrate by chemical treatment. Formation of the diffusion layer by chemical treatment enables fabrication of a larger diffusion at relatively low cost, compared to a diffusion plate formed by an array of micro-lenses. In general, the maximum spreading angle of a diffusion plate having a diffusion layer formed by chemical treatment is larger than the maximum spreading angle of a diffusion plate on which an array of micro-lenses is formed. However, condenser lens 41 can efficiently condense the light exiting from rotary diffusion plate 40.

In light source device 58 in the first exemplary embodiment, the diffusion surface is rotated by rotary diffusion plate 40 to change timewise and space-wise at a high speed a random interference pattern on a screen caused by laser lights. This can suppress speckle noise. Still more, rotation of the diffusion surface by using rotary diffusion plate 40 can also reduce fine uneven luminance caused by dividing emission regions of green laser light source 22, red laser light source 26, and blue laser light source 30 in order to correspond to the semiconductor laser elements, and due to the size of minute emission region of each semiconductor laser element.

The light multiplexed timewise by numerous diffusion angles of rotary diffusion plate 40 becomes a light with significantly reduced coherence of the laser light. This light is condensed by condenser lens 41, reflected on mirror 42, and then converted by condenser lens 43 into a substantially parallel light. Shapes of condenser lenses 41 and 43 are determined such that a spot light near rotary diffusion plate 40 becomes a substantially parallel light.

Each laser light exiting from condenser lens 43 enters dichroic mirror 44. Dichroic mirror 44 is disposed in a way such that each laser light having p-polarized component enters the surface of dichroic mirror 44 at an incident angle of 45 degrees.

Figure 2:
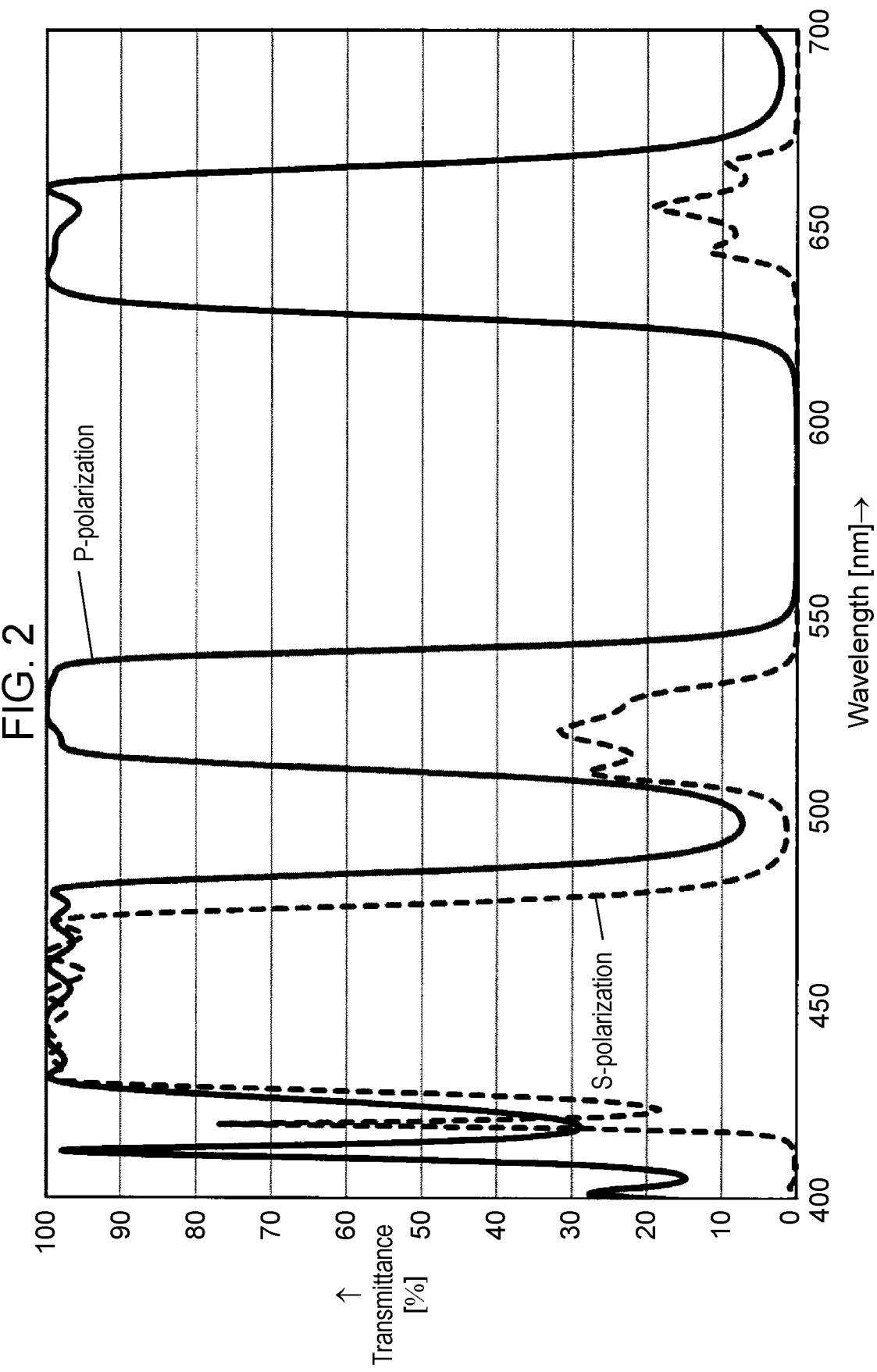
FIG. 2 is a graph of spectral characteristics of a second dichroic mirror in the light source device in accordance with the first exemplary embodiment.

FIG. 2 shows spectral characteristics of dichroic mirror 44. The spectral characteristics show transmittance to wavelength. In an example, a high refractive index material, such as $TiO_2$, and a low refractive index material, such as $SiO_2$, are alternately formed on a glass substrate to configure a 60-layer thin optical film. Dichroic mirror 44 has spectral characteristics of passing 95% or more of p-polarization and s-polarization in blue laser light at a wavelength of 445±8 nm and 465±8 nm, and passing 95% or more of p-polarization of green laser light at a wavelength of 525±8 nm and p-polarization of red laser light at a wavelength of 640±8 nm. Still more, dichroic mirror 44 has spectral characteristics of high reflectivity of reflecting 68% or more of s-polarization of green laser light at a wavelength of 525±8 nm and s-polarization of red laser light at a wavelength of 640±8 nm. Furthermore, dichroic mirror 44 has a high reflectivity characteristic of reflecting 88% or more of a cyan component at 490 to 500 nm and p-polarization and s-polarization of a color light containing green and red components at 545 to 620 nm. Accordingly, blue, green, and red laser lights pass through dichroic mirror 44 at high efficiency.

[1-1-2. Fluorescence Optical System]

On the other hand, excitation laser light source 47 includes blue semiconductor laser substrate 45 on which multiple blue laser semiconductor laser elements are two-dimensionally arranged at predetermined intervals, and collimator lens array 46 on which multiple collimator lenses corresponding to blue semiconductor laser elements are two-dimensionally arranged at predetermined intervals. For example, excitation laser light source 47 has 24 (=6×4) blue semiconductor laser elements and 24 collimator lenses. Each of the blue semiconductor laser elements on blue semiconductor laser substrate 45 generates and emits a linearly polarized blue laser light at a wavelength of 455±8 nm. The outgoing lights from the blue semiconductor laser elements on blue semiconductor laser substrate 45 are condensed by corresponding collimator lenses of collimator lens array 46, and converted to a parallel luminous flux. Heat dissipation plate 48 cools excitation laser light source 47.

The number of blue semiconductor laser elements in excitation laser light source 47 is determined such that the luminous flux formed by excitation laser light source 47 and a luminous flux formed by green laser light source 22 and red laser light source 26 become substantially equivalent when a projection display apparatus is configured.

Excitation laser light source 47 is disposed such that the laser light emitted therefrom has p-polarization and enters an incident surface of dichroic mirror 44 at an incident angle of 45 degrees.

Condenser lenses 49 and 50 reduce the diameter of the parallel luminous flux of outgoing lights from excitation laser light source 47, and then the luminous flux enters diffusion plate 51 in an exciting system. Diffusion plate 51 in the exciting system is formed by finely roughening the surface of a glass substrate. A diffusion angle of diffusion plate 51 in the exciting system is as small as approximately 5 degrees. Accordingly, diffusion plate 51 in the exciting system retains the polarization characteristics of the incident light. The light exiting from diffusion plate 51 in the exciting system enters dichroic mirror 44.

A p-polarized light entering dichroic mirror 44 from diffusion plate 51 in the exciting system and passing through dichroic mirror 44 is condensed by condenser lenses 52 and 53, and then enters phosphor plate 57. Diffusion plate 51 in the exciting system diffuses the incident light such that the diameter of a spot light of the light emitted therefrom has a predetermined spot diameter at entering phosphor plate 57. For example, diffusion plate 51 in the exciting system is configured to achieve the spot light diameter of 2 to 3 mm when the light emitted therefrom enters phosphor plate 57.

Phosphor plate 57 includes circular aluminum substrate 54 on which a reflection film and phosphor layer 55 are formed, and motor 56 provided at the center of aluminum substrate 54. Phosphor plate 57 is rotationally driven. The reflection film of phosphor plate 57 is a metal film or dielectric film that reflects visible lights, and is formed on aluminum substrate 54. Phosphor layer 55 is further formed on the reflection film. The Ce-activated YAG yellow phosphor that generates yellow light containing green- and red-light components when excited by blue light is formed in phosphor layer 55. A typical chemical composition of a crystal matrix of this phosphor is $Y_3Al_5O_{12}$. Phosphor layer 55 is formed in a ring shape. Phosphor layer 55 excited by a spot light generates the yellow light containing the green- and red-light components. Since phosphor plate 57 includes the aluminum substrate having high heat conductivity, and is also rotationally driven, a temperature rise of phosphor layer 55 due to excitation light is suppressed to stably retain the fluorescence conversion efficiency. The light entering phosphor layer 55 emits a fluorescent light containing the green light and the red light. The fluorescent light does not have speckle noise. A part of the fluorescent light generated by phosphor layer 55 is emitted to condenser lenses 53 and 52, and other part of the fluorescent light generated by phosphor layer 55 is reflected on the reflection film and directed to condenser lenses 53 and 52. The green light and red light emitted from phosphor plate 57 become random polarized lights. They are condensed again and converted to substantially parallel lights by condenser lenses 53 and 52, and enter dichroic mirror 44.

Figure 3:
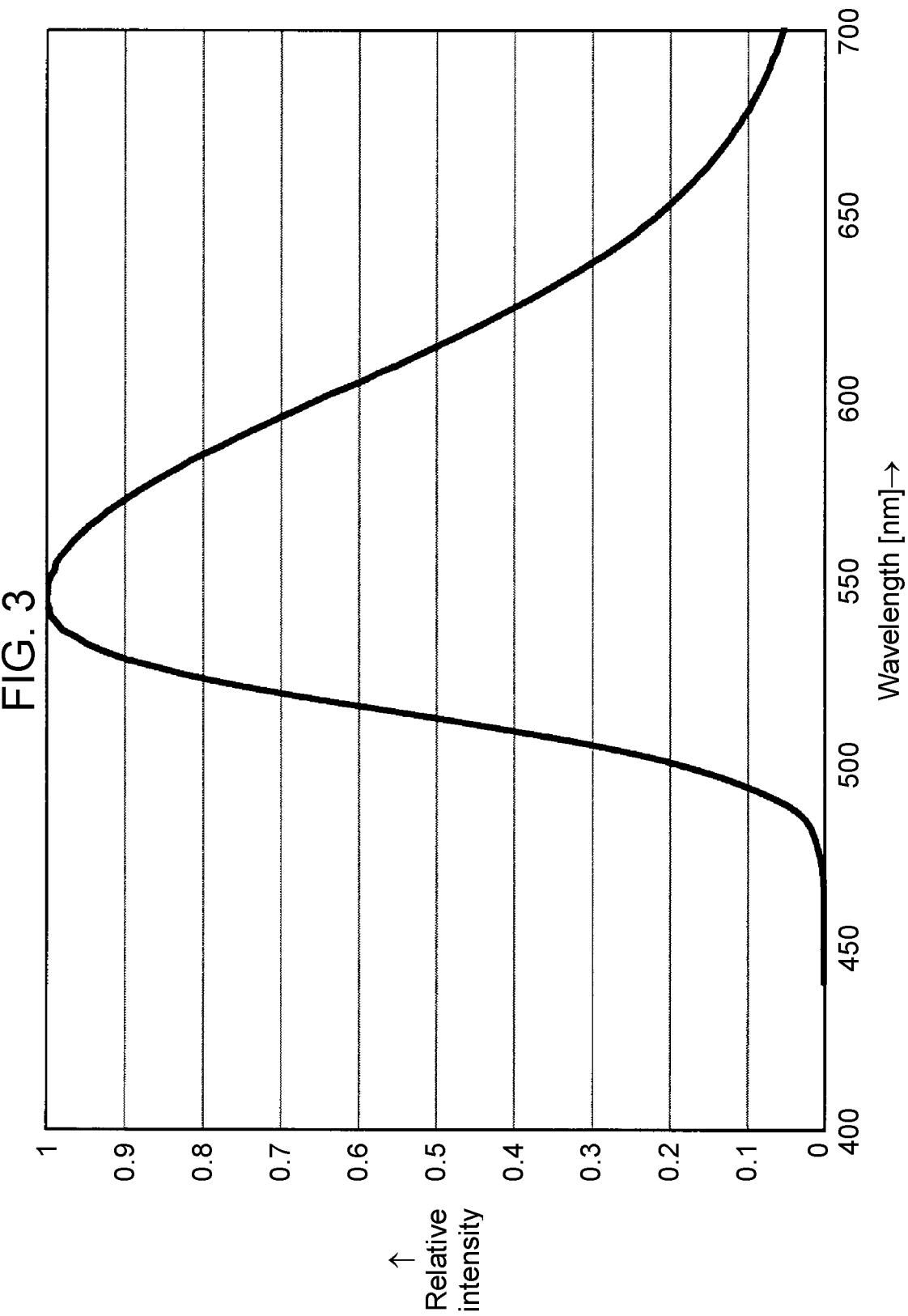
FIG. 3 is a graph of spectral characteristics of a phosphor plate in the light source device in accordance with the first exemplary embodiment.

FIG. 3 shows spectral characteristics of phosphor plate 57. The spectral characteristics show a relative intensity of fluorescent light to wavelength. The fluorescent light is a yellow light with chromaticity (x, y)=(0.490, 0.550) having a peak at 544 nm. The characteristic of dichroic mirror 44 is to pass 96% or more of the p-polarized component and 32% or less of the s-polarized component at wavelength bands of green laser light and red laser light but reflect other components in the fluorescent light spectrum. Accordingly, approximately 80% of the luminous flux of fluorescent light generated at phosphor plate 57 is reflected on dichroic mirror 44.

[1-1-3. Combining Outgoing Lights from the Laser Optical System and Fluorescence Optical System]

Dichroic mirror 44 passes 96% of blue, green and red laser lights generated by the laser optical system, and reflects 80% of fluorescent light generated by the fluorescence optical system. Accordingly, dichroic mirror 44 can combine blue, green and red laser lights and fluorescent light on the same optical axis at high efficiency. A combined light of the blue, green, and red laser lights and fluorescent light exiting from dichroic mirror 44 is a light with a wide color gamut and without speckle noise of laser lights.

Condenser lens 59 passes an outgoing light from light source device 58, mirror 60 reflects the light, and condenser lens 61 condenses the light toward rod integrator 62 (partially illustrated), which is a light-homogenizing element.

The above example refers to the case that outgoing lights from green laser light source 22, red laser light source 26, and blue laser light source 30 have p-polarization and are incident on red reflective dichroic mirror 33 and blue reflective dichroic mirror 34. However, the outgoing lights from these laser light sources are applicable as long as the lights ultimately have p-polarization at entering dichroic mirror 44. Accordingly, these lights may be polarized in directions different from p-polarization at entering red reflective dichroic mirror 33 and blue reflective dichroic mirror 34. In this case, the plane of polarization of outgoing lights having linearly polarized component from the laser light sources is rotated, typically using a retardation plate, so that the lights incident on dichroic mirror 44 have the p-polarization.

The above example refers to the case of disposing 24, 24, 12, and 24 semiconductor laser elements on green laser light source 22, red laser light source 26, blue laser light source 30, and excitation laser light source 47, respectively. However, each of the laser light sources may be configured with a larger number of semiconductor laser elements to increase luminance.

As described above, in light source device 58 in the first exemplary embodiment, dichroic mirror 44 combines the blue, green, and red laser lights with reduced speckle noise achieved by rotary diffusion plate 40 and the fluorescent light with no speckle noise on the same optical axis. Accordingly, light source device 58 smaller in size, compared to the prior art, can be configured to generate outgoing lights with a wide color gamut, including blue, green and red laser lights, while suppressing speckle noise and fine uneven luminance.

[1-2. Advantages]

Light source device 58 in the first exemplary embodiment includes the laser optical system, the fluorescence optical system, and the light combiner for combining outgoing lights from the laser optical system and fluorescence optical system. The laser optical system includes green laser light source 22, red laser light source 26, and blue laser light source 30 (corresponding to the first laser light sources) that are laser light sources for generating blue light, green light, and red light, respectively; red reflective dichroic mirror 33 and blue reflective dichroic mirror 34 (corresponding to the first dichroic mirror) for combining outgoing lights from the laser light sources, and rotary diffusion plate 40 for reducing speckle noise and uneven luminance in the outgoing lights from the laser light sources. The fluorescence optical system includes excitation laser light source 47 (corresponding to the second laser light source), and phosphor plate 57 that generates fluorescent light containing green light and red light by being excited by light emitted from excitation laser light source 47. The light combiner includes dichroic mirror 44 (corresponding to the second dichroic mirror). Accordingly, light source device 58 smaller in size, compared to the prior art, can be configured to generate outgoing light with a wide color gamut including blue, green, and red laser lights, while suppressing speckle noise and fine uneven luminance.

In light source device 58 in the first exemplary embodiment, outgoing lights from the first laser light sources are linearly polarized, and the emission from the laser optical system may have p-polarized at entering the surface of dichroic mirror 44. This enables dichroic mirror 44 to combine lights emitted from the laser optical system and the fluorescence optical system at high efficiency.

In light source device 58 in the first exemplary embodiment, dichroic mirror 44 may have the next spectral characteristics. In wavelength band of each light emitted from the first laser light sources, dichroic mirror 44 passes p-polarization in light incident on the surface of dichroic mirror 44. In the wavelength band of lights emitted from the first laser light sources, other than that of blue light, dichroic mirror 44 reflects s-polarization in light incident on the surface dichroic mirror 44. In the wavelength band of fluorescent light generated by phosphor plate 57, dichroic mirror 44 reflects s-polarization in light incident on the surface of dichroic mirror 44. These characteristics enable dichroic mirror 44 to combine lights emitted from the laser optical system and the fluorescence optical system at high efficiency.

In light source device 58 in the first exemplary embodiment, rotary diffusion plate 40 may include circular diffusion plate 38 (corresponding to the first circular substrate) formed of a glass that has an area with fine irregularities formed circumferentially on its surface, and motor 39 (corresponding to the first motor) that rotationally drives circular diffusion plate 38. By rotating the diffusion surface, a random coherent pattern on a screen caused by laser lights can be changed timewise and space-wise at high speed to suppress speckle noise.

In light source device 58 in the first exemplary embodiment, phosphor plate 57 includes aluminum substrate 54 (corresponding to the second circular substrate) having phosphor layer 55 in which the Ce-activated YAG yellow phosphor is formed, and motor 56 (corresponding to the second moto) for rotationally driving aluminum substrate 54. By rotating phosphor plate 57, a temperature rise of phosphor layer 55 due to excitation light can be suppressed to retain stable fluorescence conversion efficiency.

In light source device 58 in the first exemplary embodiment, the laser light sources may have semiconductor laser elements. This enables light source device 58 to generate outgoing lights with a wide color gamut.

In light source device 58 in the first exemplary embodiment, excitation laser light source 47 may have blue semiconductor laser elements. This enables the operation at high luminous efficiency and generation of a white light having predetermined chromaticity by a small light output.

Second Exemplary Embodiment

[2-1. Structure]

Figure 4:
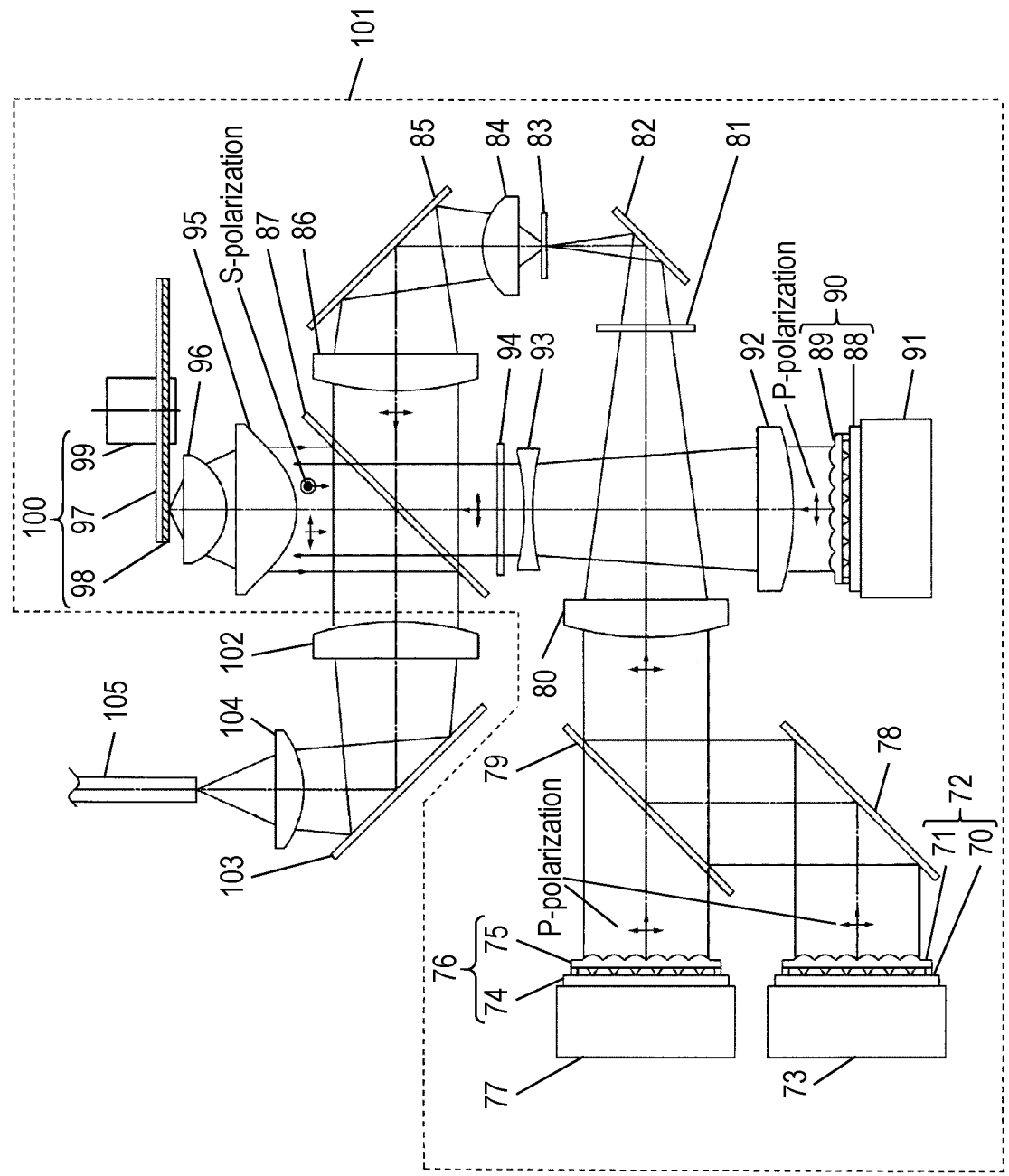
FIG. 4 is a schematic plan view of a structure of a light source device in accordance with a second exemplary embodiment.

FIG. 4 is a schematic plan view illustrating a structure of light source device 101 in the second exemplary embodiment. Light source device 101 excludes green laser light source 22 in light source device 58 in the first exemplary embodiment, and only a red color gamut is widened in outgoing lights including the fluorescent light generated at the phosphor plate.

In FIG. 4, light source device 101 includes red laser light source 72 and blue laser light source 76 that are first laser light sources, and excitation laser light source 90 that is a second laser light source. Red laser light source 72 includes red semiconductor laser substrate 70 on which multiple red semiconductor laser elements are disposed, and collimator lens array 71. Blue laser light source 76 includes blue semiconductor laser substrate 74 on which multiple blue semiconductor laser elements are disposed, and collimator lens array 75. Excitation laser light source 90 includes blue semiconductor laser substrate 88 on which multiple blue semiconductor laser elements are disposed, and collimator lens array 89.

Light source device 101 also includes heat dissipation plates 73, 77, and 91; mirrors 78, 82, and 85; red reflective dichroic mirror 79 that is a first dichroic mirror; condenser lenses 80, 84, 86, 92, 93, 95, and 96; and diffusion plates 81 and 83. Light source device 101 further includes dichroic mirror 87 that is a second dichroic mirror, and phosphor plate 100 having aluminum substrate 97 and motor 99. A reflection film and phosphor layer 98 are formed on aluminum substrate 97. Condenser lenses 102 and 104, mirror 103, and rod integrator 105 are provided outside light source device 101.

Polarization directions of outgoing lights from the laser light sources and incident lights and outgoing lights of the dichroic mirrors are indicated in FIG. 4.

In the exemplary embodiment, an optical system from red laser light source 72 and blue laser light source 76 to dichroic mirror 87 is referred to as a "laser optical system." An optical system from excitation laser light source 90 to phosphor plate 100 is referred to as a "fluorescence optical system."

[2-1-1. Laser Optical System]

Light source device 101 in the exemplary embodiment includes only red laser light source 72 and blue laser light source 76, instead of green laser light source 22 red laser light source 26, and blue laser light source 30 in light source device 58 in the first exemplary embodiment. Still more, light source device 101 only includes red reflective dichroic mirror 79 as the first dichroic mirror, instead of red reflective dichroic mirror 33 and blue reflective dichroic mirror 34 that are the first dichroic mirrors in light source device 58. Furthermore, light source device 101 only includes fixed diffusion plate 83, instead of diffusion plate 36 and rotary diffusion plate 40 in light source device 58. These are the points that light source device 101 in the second exemplary embodiment differs from light source device 58 in the first exemplary embodiment.

Red laser light source 72 includes red semiconductor laser substrate 70 on which multiple red semiconductor laser elements are two-dimensionally arranged at predetermined intervals, and collimator lens array 71 on which multiple collimator lenses corresponding to the red semiconductor laser elements are two-dimensionally arranged at predetermined intervals. For example, red laser light source 72 has 12 (=6×2) red semiconductor laser elements and 12 collimator lenses. Each of the red semiconductor laser elements on red semiconductor laser substrate 70 generates and emits a linearly polarized red laser light at a wavelength of 640±8 nm. The outgoing lights from the red semiconductor laser elements on red semiconductor laser substrate 70 are condensed by corresponding collimator lenses of collimator lens array 25, and converted to a parallel luminous flux. Heat dissipation plate 73 cools red semiconductor laser substrate 70.

Blue laser light source 76 includes blue semiconductor laser substrate 74 on which multiple blue semiconductor laser elements are two-dimensionally arranged at predetermined intervals, and collimator lens array 75 on which multiple collimator lenses corresponding to the blue semiconductor laser elements are two-dimensionally arranged at predetermined intervals. For example, blue laser light source 76 has 12 (=6×2) blue semiconductor laser elements and 12 collimator lenses. Each of the blue semiconductor laser elements on blue semiconductor laser substrate 74 generates and emits a linearly polarized blue laser light at a wavelength of 455±8 nm. The outgoing light from the blue semiconductor laser elements on blue semiconductor laser substrate 74 are condensed by corresponding collimator lenses in collimator lens array 29, and converted to a parallel luminous flux. Heat dissipation plate 77 cools blue semiconductor laser substrate 74.

Laser lights emitted from blue laser light source 76 and a laser light emitted from red laser light source 72 and reflected on mirror 78 enter red reflective dichroic mirror 79. Red laser light source 72 and blue laser light source 76 are arranged in a way such that each emitted laser light has p-polarization and enters red reflective dichroic mirror 79 at an incident angle of 45 degrees. Red reflective dichroic mirror 79 has a characteristic of passing 95% or more of the blue laser light entered, and reflecting 97% or more of the red laser light entered. A half maximum wavelength at which the transmittance of red reflective dichroic mirror 79 becomes 50% is set to 583 nm.

Laser lights combined at red reflective dichroic mirror 79 enter condenser lens 80. The shape of condenser lens 80 is determined such that each laser light is condensed near diffusion plate 83. The laser lights passing condenser lens 80 are diffused by diffusion plate 81 and then reflected on mirror 82, and enter rotary diffusion plate 83.

Each of diffusion plates 81 and 83 has a diffusion surface formed by arranging an array of fine micro-lenses on a glass substrate to diffuse incident light. The diffusion angle of diffusion plate 81 is approximately 3 degrees, and the diffusion angle of diffusion plate 83 is approximately 10 degrees. Accordingly, diffusion plates 81 and 83 retain the polarization characteristics of the incident light. Diffusion plate 81 diffuses the incident light such that a spot light diameter of the outgoing light therefrom entering near diffusion plate 83 has a predetermined spot diameter. In light source device 101 in the second exemplary embodiment, light outputs of red laser light source 72 and blue laser light source 76 are low, compared to that of the structure in the first exemplary embodiment, and therefore speckle noise can be sufficiently reduced just by fixed diffusion plate 83, without using the rotary diffusion plate.

The light multiplexed by numerous diffusion angles of diffusion plates 81 and 83 becomes a light with considerably reduced coherence of the laser light. This light is condensed by condenser lens 84, reflected on mirror 85, and then converted by condenser lens 86 into a substantially parallel light. Shapes of condenser lenses 84 and 86 are determined such that a spot light near diffusion plate 83 becomes a substantially parallel light.

Each laser light exiting condenser lens 86 enters dichroic mirror 87. Dichroic mirror 87 is disposed in a way such that blue and red laser light having p-polarization enter the surface of dichroic mirror 87 at an incident angle of 45 degrees.

Figure 5:
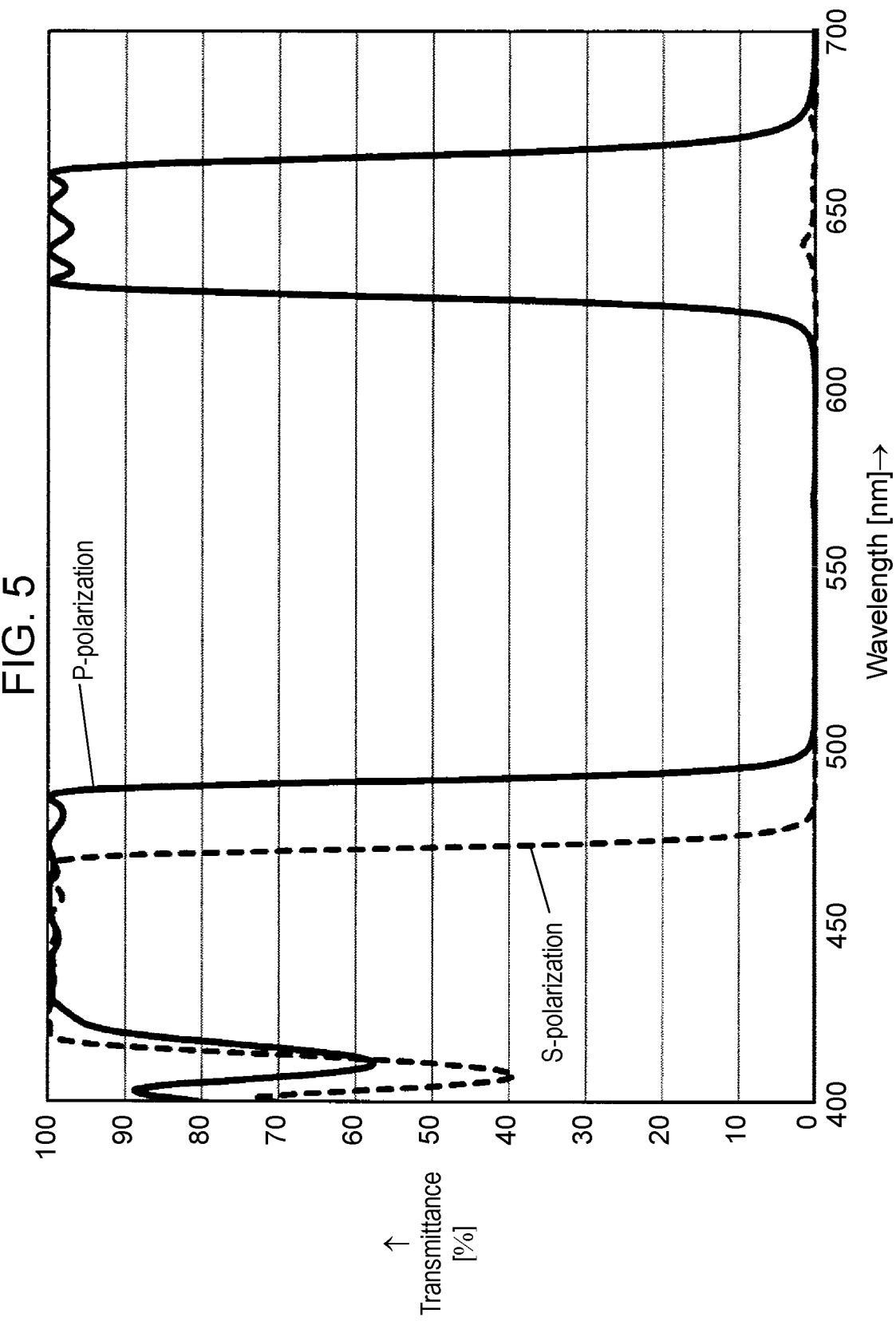
FIG. 5 is a graph of spectral characteristics of a second dichroic mirror in the light source device in accordance with the second exemplary embodiment.

FIG. 5 shows spectral characteristics of dichroic mirror 87. The spectral characteristics show transmittance to wavelength. In an example, a high refractive index material, such as $TiO_2$, and a low refractive index material, such as $SiO_2$, are alternately formed on a glass substrate to configure a 60-layer thin optical film. Dichroic mirror 87 has spectral characteristics of passing 95% or more of p-polarization and s-polarization of blue laser light at a wavelength of 455±8 nm and p-polarization of red laser light at a wavelength of 640±8 nm. Still more, dichroic mirror 87 has a high reflectivity characteristic of reflecting 97% or more of s-polarization of red laser light at a wavelength of 640±8 nm. Furthermore, dichroic mirror 87 has a high reflectivity characteristic of reflecting 97% or more of p-polarization and s-polarization containing blue, green, and red components at 500 to 615 nm and 680 to 780 nm. Accordingly, blue and red laser lights pass through dichroic mirror 87 at high efficiency.

[2-1-2. Fluorescence Optical System]

On the other hand, excitation laser light source 90 includes blue semiconductor laser substrate 88 on which multiple blue laser semiconductor laser elements are two-dimensionally arranged at predetermined intervals, and collimator lens array 89 on which multiple collimator lenses corresponding to blue semiconductor laser elements are two-dimensionally arranged at predetermined intervals. For example, excitation laser light source 90 has 36 (=6×6) blue semiconductor laser elements and 36 collimator lenses. Each of the blue semiconductor laser elements on blue semiconductor laser substrate 88 generates and emits a linearly polarized blue laser light at a wavelength of 455±8 nm. The outgoing lights from the blue semiconductor laser elements on blue semiconductor laser substrate 45 are condensed by corresponding collimator lenses in collimator lens array 46, and converted to a parallel luminous flux.

Excitation laser light source 90 is disposed such that the laser light emitted therefrom has p-polarization and enters an incident surface of dichroic mirror 87 at an incident angle of 45 degrees.

Condenser lenses 92 and 93 reduce the diameter of the parallel luminous flux of outgoing lights from excitation laser light source 90, and then the luminous flux enters diffusion plate 94 in an exciting system. Diffusion plate 94 in the exciting system is formed by finely roughening the surface of a glass substrate. A diffusion angle of diffusion plate 94 in the exciting system is as small as approximately 5 degrees. Accordingly, diffusion plate 94 in the exciting system retains the polarization characteristics of the incident light. The light exiting diffusion plate 94 in the exciting system enters dichroic mirror 87.

A p-polarized component entering dichroic mirror 87 from diffusion plate 94 in the exciting system and passing through dichroic mirror 87 is condensed by condenser lenses 95 and 96, and then enters phosphor plate 100. Diffusion plate 94 in the exciting system diffuses the incident light such that the diameter of a spot light of the light emitted therefrom has a predetermined spot diameter at entering phosphor plate 100. For example, diffusion plate 94 in the exciting system is configured to achieve the spot light diameter of 2 to 3 mm when the light emitted therefrom enters phosphor plate 100.

Phosphor plate 100 includes circular aluminum substrate 97 on which a reflection film and phosphor layer 98 are formed, and motor 99 provided at the center of aluminum substrate 97. Phosphor plate 100 is rotationally driven. The reflection film of phosphor plate 100 is a metal film or dielectric film that reflects visible lights, and is formed on aluminum substrate 97. Phosphor layer 98 is formed o the reflection film. The Ce-activated YAG yellow phosphor that generates yellow light containing green- and red-light components when excited by blue light is formed in phosphor layer 98. A typical chemical composition of a crystal matrix of this phosphor is $Y_3Al_5O_{12}$. Phosphor layer 98 is formed in a ring shape. Phosphor layer 98 excited by a spot light generates the yellow light containing the green- and red-light components. Since phosphor plate 100 includes the aluminum substrate having high heat conductivity, and is also rotationally driven, a temperature rise of phosphor layer 98 due to excitation light is suppressed to stably retain the fluorescence conversion efficiency. The light entering phosphor layer 98 generates a fluorescent light containing the green light and the red light. The fluorescent light does not have speckle noise. A part of the fluorescent light generated by phosphor layer 55 is emitted to condenser lenses 96 and 95, and other part of the fluorescent light generated by phosphor layer 98 is reflected on the reflection film and directed to condenser lenses 96 and 95. The green light and red light emitted from phosphor plate 100 become random polarized lights. They are condensed again and converted to substantially parallel light by condenser lenses 96 and 97, and enter dichroic mirror 87.

The characteristic of dichroic mirror 87 is to pass 96% or more of the p-polarized component and 2% or less of the s-polarized component in the fluorescent light spectrum and wavelength bands of blue and red laser lights but reflect other components. Accordingly, approximately 98% of the luminous flux of fluorescent light generated from phosphor plate 100 is reflected on dichroic mirror 87.

[2-1-3. Combining Outgoing Lights from the Laser Optical System and Fluorescence Optical System]

Dichroic mirror 87 passes 96% of blue and red laser lights generated by the laser optical system, and reflects 98% of fluorescent light generated by the fluorescence optical system. Accordingly, dichroic mirror 87 can combine blue and red laser lights and fluorescent light on the same optical axis at high efficiency. A combined light of the blue and red laser lights and fluorescent light exiting dichroic mirror 87 is a light with a wide red color gamut and without speckle noise of laser lights.

Condenser lens 102 passes an outgoing light from light source device 101, mirror 103 reflects the light, and condenser lens 104 condenses the light toward rod integrator 105 (partially illustrated), which is a light-homogenizing element.

The above example refers to the case that outgoing lights from red laser light source 72 and blue laser light source 76 have p-polarization and are incident on red reflective dichroic mirror 79. However, the outgoing lights from these laser light sources are acceptable as long as the lights ultimately have p-polarization at entering dichroic mirror 87. Accordingly, these lights may be polarized in directions different from p-polarization at entering red reflective dichroic mirror 79. In this case, the plane of polarization of outgoing lights having linearly polarized component from the laser light sources is rotated, typically using a retardation plate, so that the lights incident on dichroic mirror 87 have the p-polarization.

The above example refers to the case of disposing 12, 12, and 36 semiconductor laser elements on red laser light source 72, blue laser light source 76, and excitation laser light source 90, respectively. However, each of the laser light sources may be configured with a larger number of semiconductor laser elements to increase luminance.

As described above, in light source device 101 in the second exemplary embodiment, dichroic mirror 87 combines the blue and red laser lights with reduced speckle noise achieved by diffusion plate 83 and the fluorescent light with no speckle noise on the same optical axis. Accordingly, light source device 101 smaller in size, compared to the prior art, can be configured to generate outgoing light with a wide red color gamut by including a red laser light, while suppressing speckle noise and fine uneven luminance.

[2-2. Advantages]

Light source device 101 in the second exemplary embodiment includes the laser optical system, the fluorescence optical system, and the light combiner for combining lights emitted from the laser optical system and fluorescence optical system. The laser optical system includes red laser light source 72 and blue laser light source 76 (corresponding to the first laser light sources) that are multiple light sources for generating blue light and red light, respectively; red reflective dichroic mirror 79 (corresponding to the first dichroic mirror) for combining lights emitted from the laser light sources, and diffusion plate 83 for reducing speckle noise and uneven luminance in lights emitted from the laser light sources. The fluorescence optical system includes excitation laser light source 90 (corresponding to the second laser light source) and phosphor plate 100 that generates fluorescent light containing green light and red light by being excited by light emitted from excitation laser light source 90. The light combiner includes dichroic mirror 87 (corresponding to the second dichroic mirror). Accordingly, light source device 101 smaller in size, compared to the prior art, can be configured to generate outgoing light with a wide color gamut including blue, green, and red laser lights, while suppressing speckle noise and fine uneven luminance.

Third Exemplary Embodiment

[3-1. Structure]

Figure 6:
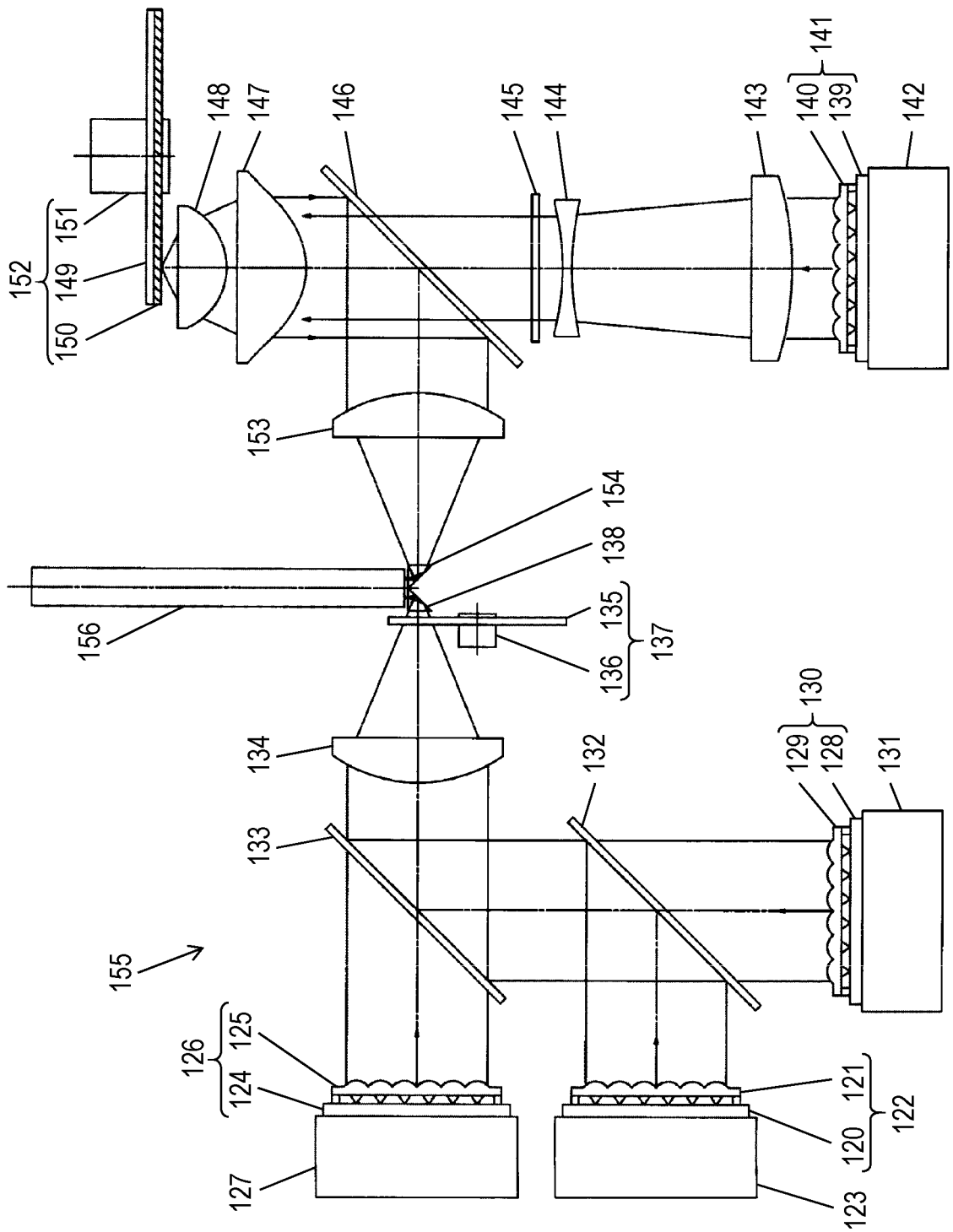
FIG. 6 is a schematic plan view of a structure of a light source device in accordance with a third exemplary embodiment.

FIG. 6 is a schematic plan view illustrating a structure of light source device 155 in the third exemplary embodiment.

In FIG. 6, light source device 155 includes green laser light source 122, red laser light source 126, and blue laser light source 130 that are first laser light sources, and excitation laser light source 141 that is a second laser light source. Green laser light source 122 includes green semiconductor laser substrate 120 on which multiple green semiconductor laser elements are disposed, and collimator lens array 121. Red laser light source 126 includes red semiconductor laser substrate 124 on which multiple red semiconductor laser elements are disposed, and collimator lens array 125. Blue laser light source 130 includes blue semiconductor laser substrate 128 on which multiple blue semiconductor laser elements are disposed, and collimator lens array 129. Excitation laser light source 141 includes blue semiconductor laser substrate 139 on which multiple blue semiconductor laser elements are disposed, and collimator lens array 140.

Light source device 155 also includes heat dissipation plates 123, 127, 131, and 142; blue transmissive dichroic mirror 132, red transmissive dichroic mirror 133, condenser lenses 134, 143, 144, 147, 148, and 153; circular diffusion plate 135, rotary diffusion plate 137 with motor 136, and prisms 138 and 154. Furthermore, light source device 155 includes phosphor plate 152 having aluminum substrate 149 and motor 151, and rod integrator 156. A reflection film and phosphor layer 150 are formed on aluminum substrate 149.

Outgoing lights from green laser light source 122, red laser light source 126, and blue laser light source 130 are indicated in FIG. 6.

In the exemplary embodiment, an optical system from green laser light source 122, red laser light source 126, and blue laser light source 130 to rotary diffusion plate 137 is referred to as a "laser optical system." An optical system from excitation laser light source 141 to reflection on phosphor plate 152 and condenser lens 153 is referred to as a "fluorescence optical system."

[3-1-1. Laser Optical System]

Green laser light source 122, red laser light source 126, and blue laser light source 130 are configured in the same way as green laser light source 22, red laser light source 26, and blue laser light source 30 described in the first exemplary embodiment.

Laser lights emitted from green laser light source 122 and blue laser light source 130 are combined by blue transmissive dichroic mirror 132, and then combined with a laser light emitted from red laser light source 126 at red transmissive dichroic mirror 133. Green laser light source 122, red laser light source 126, and blue laser light source 130 are arranged in a way such that each emitted laser light has p-polarization and enters blue transmissive dichroic mirror 132 and red transmissive dichroic mirror 133 at an incident angle of 45 degrees. Blue transmissive dichroic mirror 132 has a characteristic of passing 96% or more of the blue laser light entered and reflecting 98% or more of the green laser light entered. A half maximum wavelength of blue transmissive dichroic mirror 132 is set to 495 nm. Red transmissive dichroic mirror 133 has a characteristic of passing 96% or more of the red laser light entered and reflecting 98% or more of the green laser light and blue laser light entered. A half maximum wavelength of red transmissive dichroic mirror 133 is set to 583 nm.

A combined laser light of blue, green, and red is condensed by condenser lens 134 and enters rotary diffusion plate 137.

Rotary diffusion plate 137 includes circular diffusion plate 135 having a diffusion layer circumferentially formed on a glass substrate, and motor 136 provided at the center of circular diffusion plate 135; and is rotationally driven. The diffusion layer is formed by finely roughening the glass substrate surface by chemical treatment. Rotary diffusion plate 137 has a diffusion angle of approximately 15 degrees. Accordingly, rotary diffusion plate 137 retains the polarization characteristics of the incident light. The light multiplexed timewise by numerous diffusion angles of rotary diffusion plate 137 becomes a light with significantly reduced coherence of the laser light, and enters prism 138.

Prism 138 has a right-triangle-shaped bottom face and a 45-degree reflective surface. A light reflected on prism 138 enters rod integrator 156. An optical axis of prism 138 and an optical axis of rod integrator 156 are deflected. In other words, prism 138 and rod integrator 156 are disposed in a way such that a light reflected on prism 138 does not pass through the center of rod integrator 156. The shape of condenser lens 134 is determined to condense lights near the emission surface of prism 138.

[3-1-2. Fluorescence Optical System]

On the other hand, excitation laser light source 141 is configured in the same way as excitation laser light source 47 described in the first exemplary embodiment.

Condenser lenses 143 and 144 reduce the diameter of a parallel luminous flux of outgoing lights from excitation laser light source 141, and then the luminous flux enters diffusion plate 145 in an exciting system. Diffusion plate 145 in the exciting system diffuses incident light at a diffusion angle of approximately 4 degrees. An outgoing light from diffusion plate 145 in the exciting system passes through blue transmissive dichroic mirror 146, is condensed by condenser lenses 147 and 148, and enters phosphor plate 152. For example, diffusion plate 145 in the exciting system is configured to achieve a spot diameter of 1.5 mm to 2.5 mm when the light emission therefrom enters phosphor plate 152.

Phosphor plate 152 includes circular aluminum substrate 149 on which a reflection film and phosphor layer 150 are formed, and motor 151 provided at the center of aluminum substrate 149. Phosphor plate 152 is rotationally driven. The Ce-activated YAG yellow phosphor that generates yellow light containing green- and red-light components when excited by blue light is formed in phosphor layer 150. Excited phosphor layer 150 generates the yellow light containing green- and red-light components. The fluorescent light does not have speckle noise. The green light and red light emitted from phosphor plate 152 are randomly polarized, and condensed again and converted to substantially parallel lights by condenser lenses 147 and 148. Then, the converted lights are reflected on blue transmissive dichroic mirror 146. The lights reflected on blue transmissive dichromic mirror 146 are condensed by condenser lens 153 and enter prism 154.

Prism 154 has a right-triangle-shaped bottom face and a 45-degree reflective surface. The light reflected on prism 154 enters rod integrator 156. The optical axis of prism 154 and the optical axis of rod integrator 156 are deflected. In other words, prism 154 and rod integrator 156 are disposed in a way such that a light reflected on prism 154 does not pass through the center of rod integrator 156. The shape of condenser lens 153 is determined to condense lights near the emission surface of prism 154.

[3-1-3. Combining Outgoing Lights from the Laser Optical System and Fluorescence Optical System]

Blue, green, and red laser lights generated in the laser optical system enter rod integrator 156, which is a light-homogenizing element, via prism 138. The fluorescent light generated in the fluorescence optical system enters rod integrator 156 via prism 154. Accordingly, prism 138 and prism 154 deflect and combine blue, green, and red laser lights and fluorescent light at high efficiency. The combined light of blue, green, and red laser lights and fluorescent light emitted from rod integrator 156 is a light with a wide color gamut and without speckle noise of laser lights.

The above example refers to the case that outgoing lights from green laser light source 122, red laser light source 126, and blue laser light source 130 have p-polarization and are incident on blue transmissive dichroic mirror 132 and red transmissive dichroic mirror 133. However, the outgoing lights from these laser light sources may be polarized at random, in addition to linear polarization.

The above example refers to the case of disposing 24, 24, 12, and 24 semiconductor laser elements on green laser light source 122, red laser light source 126, blue laser light source 130, and excitation laser light source 141, respectively.

However, each of the laser light sources may be configured with a larger number of semiconductor laser elements to increase luminance.

As described above, in light source device 155 in the third exemplary embodiment, prisms 138 and 154 deflect and combine the blue, green, and red laser lights with reduced speckle noise achieved by rotary diffusion plate 137 and the fluorescent light with no speckle noise. Accordingly, light source device 155 smaller in size, compared to the prior art, can be configured to generate outgoing lights with a wide color gamut, including blue, green and red laser lights, while suppressing speckle noise and fine uneven luminance.

[3-2. Advantages]

Light source device 155 in the third exemplary embodiment includes the laser optical system, the fluorescence optical system, and the light combiner for combining lights emitted from the laser optical system and fluorescence optical system. The laser optical system includes green laser light source 122, red laser light source 126, and blue laser light source 130 (corresponding to the first laser light sources) that are multiple light sources for generating blue light, green light, and red light; blue transmissive dichroic mirror 132 and red transmissive dichroic mirror 133 for combining lights emitted from the laser light sources, and rotary diffusion plate 137 for reducing speckle noise and uneven luminance in lights emitted from the laser light sources. The fluorescence optical system includes excitation laser light source 141 (corresponding to the second laser light source), and phosphor plate 152 that reflects fluorescent light containing green light and red light by being excited by light emitted from excitation laser light source 141. The light combiner includes prisms 138 and 154 for deflecting and combining outgoing lights from the laser optical system and the fluorescence optical system. Accordingly, light source device 155 smaller in size, compared to the prior art, can be configured to generate outgoing lights with a wide color gamut, including blue, green, and red laser lights, while suppressing speckle noise and fine uneven luminance.

Fourth Exemplary Embodiment

[4-1. Structure]

Figure 7:
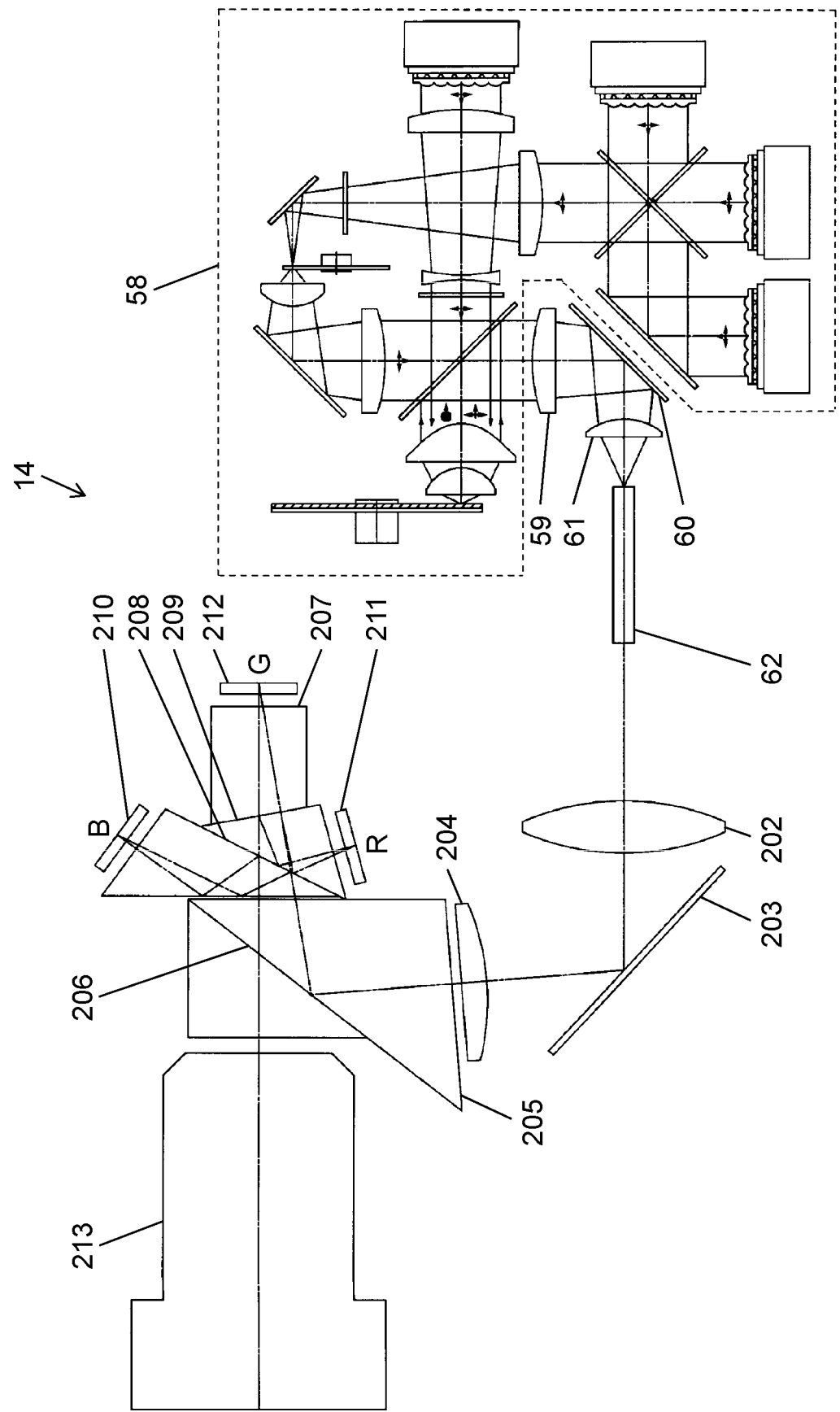
FIG. 7 is a schematic plan view of a structure of a projection display apparatus in accordance with a fourth exemplary embodiment.

FIG. 7 is projection display apparatus 14 in the fourth exemplary embodiment. Projection display apparatus 14 in the fourth exemplary embodiment employs three digital micromirror devices (DMDs) as an image forming means.

In FIG. 7, a combined light of laser lights and fluorescent light emitted from light source device 58 passes through condenser lens 59, is then reflected on mirror 60, and is condensed to rod integrator 62 by condenser lens 61. Incident light on rod integrator 62 is reflected multiple times inside rod integrator 62 so that the exiting light has a uniform distribution of light intensity. The light exiting from rod integrator 62 is condensed by relay lens 202, reflected on reflection mirror 203, then passes through field lens 204, and enters total internal reflection prism 205.

Total internal reflection prism 205 is configured with two prisms. A thin air layer 206 is formed between adjacent surfaces of both prisms. Air layer 206 totally reflects incident light at an angle not smaller than the critical angle. Incident light from field lens 204 to total internal reflection prism 205 is reflected on the total reflection surface of total internal reflection prism 205, and enters color prism 207.

Color prism 207 is configured with three prisms, and blue reflective dichroic mirror 208 and red reflective dichroic mirror 209 are formed between adjacent surfaces of the prisms. Incident light on color prism 207 is separated to blue light, red light, and green light by blue reflective dichroic mirror 208 and red reflective dichroic mirror 209 of color prism 207. These lights enter DMDs 210, 211, and 212, respectively.

DMDs 210, 211, and 212 have an array of multiple micromirrors. DMDs 210, 211, and 212 deflect each micromirror according to an image signal, and incident light is directed to projection lens 213 or reflected toward outside the effective area of projection lens 213. Light reflected by DMDs 210, 211, and 212 passes through color prism 207 again. In a process of passing through color prism 207, separated blue light, red light, and green light are combined and enter total internal reflection prism 205.

Since light from color prism 207 is made incident on total internal reflection prism 205 at an angle not larger than the critical angle, the light passes through air layer 206 and enters projection lens 213. Projection lens 213 magnifies and projects an image light formed by DMD 210, 211, and 212 on a screen (not illustrated).

Green laser light source 22, red laser light source 26, blue laser light source 30, and excitation laser light source 47 are configured in a way such that a luminous flux of each laser light and a luminous flux of fluorescent light become substantially equivalent. The color gamut covers color standards DCI (Digital Cinema Initiatives). By independently controlling each laser light source, the color gamut of the outgoing light from light source device 58 can be adjusted to include color standards DCI to Rec. 2020.

Light source device 58 combines blue, green, and red laser lights with reduced speckle noise achieved by rotary diffusion plate 40 and fluorescent light without speckle noise on the same optical axis by dichroic mirror 44. Accordingly, a projection display apparatus smaller in size, compared to the prior art, can be configured to generate an image light with a wide color gamut and without speckle noise.

The above example refers to the case of generating blue laser light at a wavelength of 465±8 nm by each blue semiconductor laser element of blue laser light source 30. However, a light source at another wavelength may be used. For example, a blue laser light source generating blue laser light at wavelength of 465±8 nm and a blue laser light source generating blue laser lights at wavelength of 445±8 nm may be used. In this case, blue laser light at two wavelengths of 445 nm and 465 nm, 525-nm green laser light and green component light of fluorescent light, and 640-nm red laser light and red component light of fluorescent light are generated. Since each of blue, green and red lights has two emission spectrums, a wavelength division multiplex stereoscopic display apparatus can be configured.

Projection display apparatus 14 in the fourth exemplary embodiment may employ light source device 101 or 155 in the second exemplary embodiment or the third exemplary embodiment, instead of light source device 58 in the first exemplary embodiment. When light source device 101 in the second exemplary embodiment is employed, a projection display apparatus smaller in size, compared to the prior art, can be configured to achieve a wide red color gamut of color standards DCI while suppressing speckle noise and uneven luminance. When light source device 155 in the third exemplary embodiment is employed, a highly efficient projection display apparatus with a wide color gamut can be achieved, while suppressing speckle noise and uneven luminance.

Projection display apparatus 14 in the fourth exemplary embodiment employs DMDs 210, 211, and 212 as the image forming means. Accordingly, a projection display apparatus with high light resistance and heat resistance, compared to image forming means using liquid crystal, can be configured. Still more, since projection display apparatus 14 employs three DMDs 210, 211, and 212, a bright and high-definition projection image with good color reproduction can be achieved.

As described above, the projection display apparatus in the fourth exemplary embodiment includes the light source device having the dichroic mirror for combining the blue, green, and red laser lights with reduced speckle noise and the fluorescent light without speckle noise on the same optical axis, or the prism for deflecting and combining these lights. This achieves a projection display apparatus smaller in size, compared to the prior art, that can generate outgoing lights in a wide color gamut while suppressing speckle noise and uneven luminance.

[4-2. Advantages]

Projection display apparatus 14 in the fourth exemplary embodiment includes light source device 58, an illumination optical system for condensing and irradiating outgoing lights from light source device 58 to a target lighting area, an image forming element for forming an image according to an image signal, and projection lens 213 for magnifying and projecting the image formed by the image forming element. This achieves the projection display apparatus smaller in size, compared to the prior art, that can emit lights in a wide gamut, while suppressing speckle noise and uneven luminance.

In projection display apparatus 14 in the fourth exemplary embodiment, luminous fluxes of outgoing lights from green laser light source 22 and red laser light source 26 may be substantially equivalent to luminous flux of outgoing light from excitation laser light source 47.

In projection display apparatus 14 in the fourth exemplary embodiment, the light outputs of outgoing lights from green laser light source 22, red laser light source 26, and blue laser light source 30 and the light output of outgoing light from excitation laser light source 47 may be adjustable independently. By adjusting the light output of each outgoing light independently, the color gamut of outgoing light from light source device 58 is adjusted. By independently controlling each laser light source, the color gamut of outgoing light from light source device 58 can be adjusted to cover, for example, color standards DCI to Rec. 2020.

In projection display apparatus 14 in the fourth exemplary embodiment, an image forming element may be a mirror deflection digital micromirror device (DMD). This achieves a projection display apparatus with high light resistance and heat resistance, compared to the image forming means using liquid crystal.

5. Fifth Exemplary Embodiment

[5-1. Structure]

Figure 8:
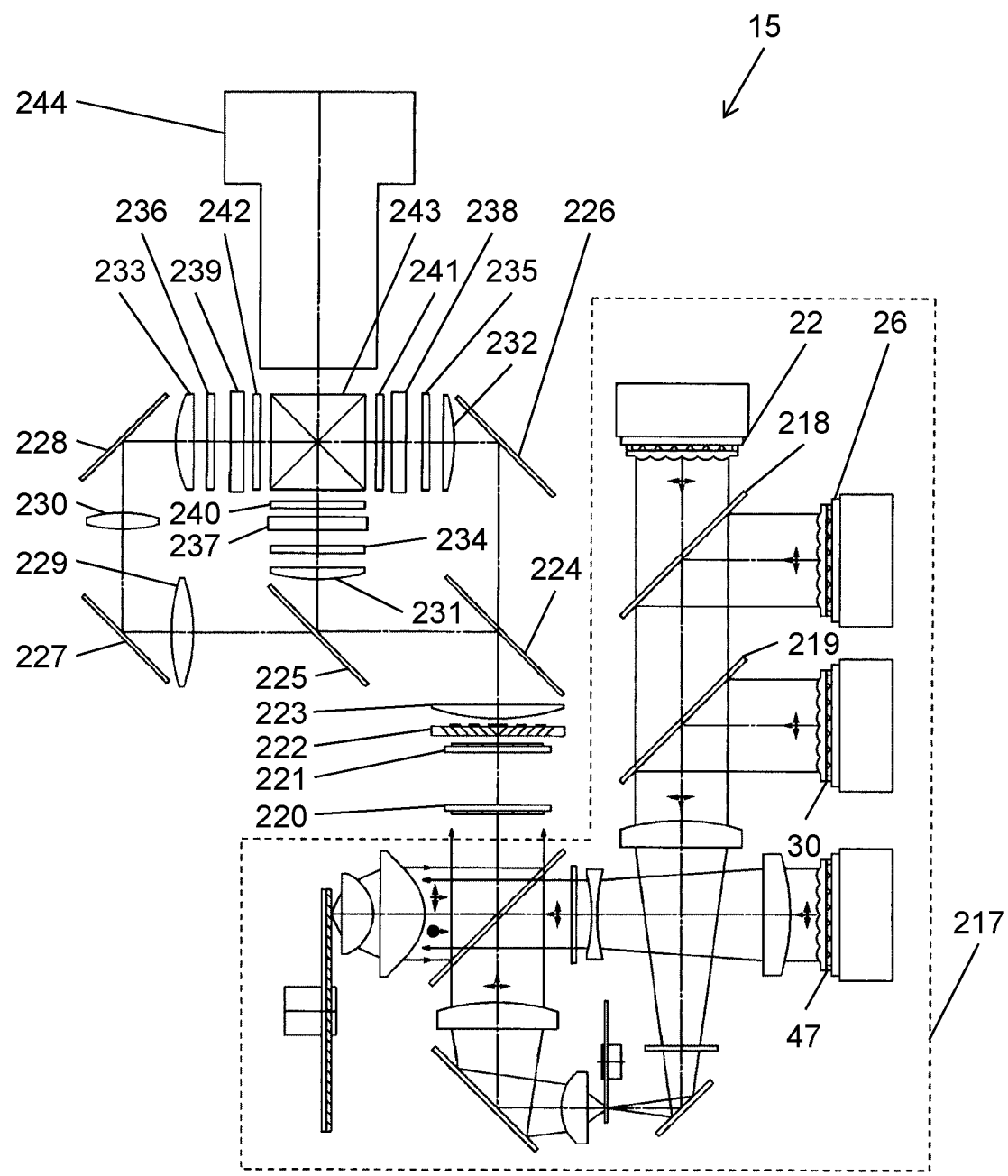
FIG. 8 is a schematic plan view of a structure of a projection display apparatus in accordance with a fifth exemplary embodiment.

FIG. 8 is a schematic plan view illustrating the structure of projection display apparatus 15 in the fifth exemplary embodiment. Projection display apparatus 15 in the fifth exemplary embodiment employs an active matrix transmission type liquid crystal panel in which thin-film transistors are formed on a pixel region in TN (Twisted Nematic) mode or VA (Vertical Alignment) mode.

The basic structure of light source device 217 in FIG. 8 is substantially same as that of light source device 58 in the first exemplary embodiment. However, red reflective dichroic mirror 218 and blue reflective dichroic mirror 219 that combine outgoing lights from green laser light source 22, red laser light source 26, and blue laser light source 30 are disposed at different positions, instead of a crossing layout at the same positions, in order to combine colors sequentially. This is the point that light source device 217 differs from light source device 58 in the first exemplary embodiment. Other structure of light source device 217 is same as that of light source device 58, and thus their description is omitted.

In FIG. 8, projection display apparatus 15 includes lens array plates 220 and 221, polarization conversion element 222, superimposing lens 223, blue transmissive dichroic mirror 224, green reflective dichroic mirror 225, reflection mirrors 226, 227, and 228; and relay lenses 229 and 230. Projection display apparatus 15 also includes field lenses 231, 232, and 233; incident-side polarization plates 234, 235, and 236; liquid crystal panels 237, 238, and 239; and exit-side polarization plates 240, 241, and 242. Furthermore, projection display apparatus 15 includes color combining prism 243 having red reflective dichroic mirror and blue reflective dichroic mirror, and projection lens 244.

In projection display apparatus 15 as configured above, a combined light of laser lights and fluorescent light emitted from light source device 217 enters lens array plate 220 having multiple lens elements. A luminous flux entering lens array plate 220 is divided into numerous luminous fluxes. These numerous divided luminous fluxes are converged by lens array plate 221 having multiple lenses. Each lens element of lens array plate 220 has an opening with a shape similar to that of liquid crystal panels 237, 238, and 239. A focal length of each lens element of lens array plate 221 is determined based on nearly conjugate relation of lens array plate 220 and liquid crystal panels 237, 238, and 239. The divided lights from lens array plate 221 enter polarization conversion element 222.

Polarization conversion element 222 includes a polarized light separation prism and a half-wave plate. Polarization conversion element 222 converts randomly polarized incident light to s-polarized light. Light exiting polarization conversion element 222 enters superimposing lens.

Superimposing lens 223 is a lens for superimposing and irradiating outgoing lights from the lens elements of lens array plate 221 onto liquid crystal panels 237, 238, and 239. Lens array plates 220 and 221 and superimposing lens 223 are called an illumination optical system. Blue transmissive dichroic mirror 224 and green reflective dichroic mirror 225, which are the color separation means, separate the outgoing light of superimposing lens 223 to blue light, green light, and red light. The green light passes through field lens 231 and incident-side polarization plate 234, and enters liquid crystal panel 237. The blue light is reflected on reflection mirror 226, then passes through field lens 232 and incident-side polarization plate 235, and enters liquid crystal panel 238. The red light passes through, is refracted, and is reflected on relay lenses 229 and 230 and reflection mirrors 227 and 228; passes through field lens 233 and incident-side polarization plate 236, and enters liquid crystal panel 239.

Incident-side polarization plate 234 and exit-side polarization plate 240 are disposed on both sides of liquid crystal panel 237 in a direction perpendicular to their transmission axes. In the same way, incident-side polarization plate 235 and exit-side polarization plate 241 are disposed on both sides of liquid crystal panel 238 in a direction perpendicular to their transmission axes. In the same way, incident-side polarization plate 236 and exit-side polarization plate 242 are disposed on both sides of liquid crystal panel 239 in a direction perpendicular to their transmission axes.

By controlling voltage applied to pixels according to image signals, three liquid crystal panels 237, 238 and 239 change the polarization state of incident light and modulate light to form green, blue, and red image lights.

The green image light entering color combining prism 243 from exit-side polarization plate 240 passes through color combining prism 243 and enters projection lens 244. The blue image light entering color combining prism 243 from exit-side polarization plate 241 is reflected on the blue reflective dichroic mirror of color combining prism 243, and enters projection lens 244. The red image light entering color combining prism 243 from exit-side polarization plate 242 is reflected on the red reflective dichroic mirror of color combining prism 243, and enters projection lens 244. In this way, color combining prism 243 combines the green, blue, and red image lights and the combined light enters projection lens 244. The light entering projection lens 244 is magnified and projected on a screen (not illustrated).

Here, blue laser light source 22, red laser light source 26, blue laser light source 30, and excitation laser light source 47 are configured such that the luminous flux of each laser light become substantially equivalent to the luminous flux of fluorescent light. The color gamut covers color standards DCI. By independently controlling each laser light source, the color gamut of outgoing light from light source device 217 can be adjusted to cover color standards DCI to Rec. 2020.

Light source device 217 combines the blue, green, and red laser lights with reduced speckle noise achieved by rotary diffusion plate 40 and the fluorescent light without speckle noise on the same optical axis by dichroic mirror 44. Accordingly, the projection display apparatus smaller in size, compared to the prior art, can be configured to generate the image light with a wide color gamut, while suppressing speckle noise.

The above example refers to the case of generating blue laser light at a wavelength of 465±8 nm by each of the blue semiconductor laser elements of blue laser light source 30. However, a light source at another wavelength may be employed. For example, a blue laser light source generating blue laser light at wavelength of 465±8 nm and another blue laser light source generating blue laser light at wavelength of 445±8 nm may be employed. In this case, the blue laser lights with two wavelengths of 445 nm and 465 nm; the 525-nm green laser light and green component light of fluorescent light; and the 40-nm red laser light and red component light of fluorescent light are generated. Since each of blue, green, and red lights has two emission spectrums, a wavelength division stereoscopic display apparatus can be configured.

The projection display apparatus in the fifth exemplary embodiment may employ the light source device in the first exemplary embodiment, the second exemplary embodiment, or the third exemplary embodiment, instead of light source device 217. When the light source device in the first exemplary embodiment is employed, the light source device can be downsized because the red reflective dichroic mirror and the blue reflective dichroic mirror are disposed in a crossing layout at the same position. When the light source device in the second exemplary embodiment is used, a projection display apparatus smaller in size, compared to the prior art, can be configured to widen a red color gamut to that of color standards DCI, while suppressing speckle noise and uneven luminance, can be achieved. When the light source device in the third exemplary embodiment is used, the projection display apparatus further includes a condenser lens to make a parallel light enter lens array plate 220 from the light exiting from the prism that combines laser lights and fluorescent light. The light source device in the third exemplary embodiment can achieve a highly efficient projection display apparatus with a wide color gamut, while suppressing speckle noise and uneven luminance.

The projection display apparatus in the fifth exemplary embodiment employs three liquid crystal panels using polarization, instead of time division system, as the image forming means. This eliminates color braking and achieves bright and high-definition projected images with good color reproduction. Still more, in the projection display apparatus in the fifth exemplary embodiment, total internal reflection prism is not required, in contrast with the case of using three DMD elements, and only a small prism with 45-degree incident is required as the color combining prism. Accordingly, the projection display apparatus can be downsized.

As described above, the projection display apparatus in the fifth exemplary embodiment includes the light source device having the dichroic mirror for combining blue, green and red laser lights with reduced speckle noise and fluorescent light without speckle noise on the same optical axis, or the prism for deflecting and combining these lights. Accordingly, the projection display apparatus smaller in size, compared to the prior art, can be configured to generate outgoing light with a wide color gamut, while suppressing speckle noise and uneven luminance.

The above example refers to the case of employing the transmissive liquid crystal panel as the image forming means. However, a reflective liquid crystal panel is also applicable. The use of reflective liquid crystal panel enables to configure a small and high-definition projection display apparatus, compared to the prior art.

[5-2. Advantages]

The projection display apparatus in the fifth exemplary embodiment includes light source device 217, the illumination optical system for condensing outgoing lights from light source device 217 and irradiating condensed light to the target lighting area, the image forming element for forming images according to image signals, and the projection lens for magnifying and projecting images formed by the image forming elements. Accordingly, the projection display apparatus smaller in size, compared to the prior art, can be configured to generate outgoing light with a wide color gamut, while suppressing speckle noise and uneven luminance.

In the projection display apparatus in the fifth exemplary embodiment, the image forming elements may be a liquid crystal panel. This enables to configure a smaller projection display apparatus compared to the case of using the DMD elements.

INDUSTRIAL APPLICABILITY

The light source device in the exemplary embodiments of the present disclosure is applicable to a projection display apparatus employing the image forming means.

What is claimed is:
1. A light source device comprising:
a laser optical system;
a fluorescence optical system; and
a light combiner combining a first outgoing light from the laser optical system and a second outgoing light from the fluorescence optical system,
wherein
the laser optical system includes:
a plurality of first laser light sources emitting a plurality of outgoing lights respectively, the plurality of outgoing lights being a blue light, a green light, and a red light, or a blue light and a red light, a first dichroic mirror combining the plurality of outgoing lights from the plurality of first laser light sources into the first outgoing light, and
a diffusion plate reducing speckle noise and an uneven luminance of each of the plurality of outgoing lights from the plurality of first laser light sources,
the fluorescence optical system includes:
a second laser light source, and
a phosphor plate emitting, as the second outgoing light, a fluorescent light containing a green light and a red light by being excited by an outgoing light from the second laser light source,
the light combiner includes a second dichroic mirror,
each of the plurality of outgoing lights from the plurality of first laser light sources is linearly polarized,
the first outgoing light from the laser optical system having a p-polarization is made incident on a surface of the second dichroic mirror, and
the second dichroic mirror has a spectral characteristic of:
passing a light with p-polarization incident on the surface of the second dichroic mirror in a wavelength band of each of the plurality of outgoing lights from the plurality of first laser light sources;
reflecting a light with s-polarization incident on the surface of the second dichroic mirror in the wavelength band of each of the plurality of outgoing lights, except for the blue light, from the plurality of first laser light sources; and
reflecting a light with s-polarization incident on the surface of the second dichroic mirror in a wavelength band of the fluorescent light generated by the phosphor plate.

2. The light source device of claim 1,
wherein
the diffusion plate includes:
a first circular substrate formed of glass having an area with fine irregularities circumferentially formed on a surface of the first circular substrate, and
a first motor rotationally driving the first circular substrate.

3. The light source device of claim 1,
wherein
the phosphor plate includes:
a second circular substrate having a phosphor layer in which a Ce-activated YAG yellow phosphor is formed, and
a second motor rotationally driving the second circular substrate.

4. The light source device of claim 1, wherein each of the plurality of first laser light sources has a semiconductor laser element.

5. A projection display apparatus comprising:
the light source device of claim 1;
an illumination optical system condensing and applying an outgoing light from the light source device to an illuminated area;
an image forming element forming an image according to an image signal; and
a projection lens magnifying and projecting the image formed by the image forming element.

6. The projection display apparatus of claim 5, wherein a luminous flux of each of the plurality of outgoing lights, except for the blue light, from the plurality of first laser light sources, is substantially equivalent to a luminous flux of the outgoing light from the second laser light source.

7. The projection display apparatus of claim 5, wherein a light output of each of the plurality of outgoing lights from the plurality of first laser light sources and a light output of the outgoing light from the second laser light source are independently adjustable, and a color gamut of the outgoing light from the light source device is adjusted by adjusting the light output of each of the plurality of outgoing lights and the light output of the outgoing light.

8. The projection display apparatus of claim 5, wherein the image forming element is a mirror deflection digital micromirror device (DMD).

9. The projection display apparatus of claim 5, wherein the image forming element is a liquid crystal panel.

* * * * *